(12) United States Patent
Kouda et al.

(10) Patent No.: US 6,561,341 B1
(45) Date of Patent: May 13, 2003

(54) APPARATUS FOR SEPARATING AND SUPPLYING CYLINDRICAL CANS AND METHOD THEREFORE

(75) Inventors: Minoru Kouda, Osaka (JP); Tomotaka Kawano, Kyoto (JP); Ryuichiro Ebi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/786,671

(22) PCT Filed: Jun. 29, 2000

(86) PCT No.: PCT/JP00/04273
§ 371 (c)(1),
(2), (4) Date: Jun. 4, 2001

(87) PCT Pub. No.: WO01/04026
PCT Pub. Date: Jan. 18, 2001

(30) Foreign Application Priority Data

Jul. 8, 1999 (JP) .......................................... 11-194006

(51) Int. Cl.[7] .............................................. B65G 47/84
(52) U.S. Cl. ................................. 198/472.1; 198/803.6
(58) Field of Search ........................... 198/472.1, 803.6

(56) References Cited

U.S. PATENT DOCUMENTS

| | | | | |
|---|---|---|---|---|
| 2,578,733 A | * | 12/1951 | Nordquist et al. | 198/472.1 |
| 2,687,202 A | * | 8/1954 | Nordquist et al. | 198/472.1 |
| 2,919,801 A | * | 1/1960 | Pechy | 198/472.1 |
| 3,795,137 A | | 3/1974 | Lo et al. | |
| 3,893,562 A | * | 7/1975 | Hurst | 198/472.1 |
| 3,941,242 A | * | 3/1976 | Braden | 198/472.1 |
| 5,695,041 A | | 12/1997 | Kouda et al. | |
| 5,727,369 A | * | 3/1998 | Mosse | 198/803.6 |

FOREIGN PATENT DOCUMENTS

| | | |
|---|---|---|
| JP | 3-156850 | 7/1991 |
| JP | 3-200625 | 9/1991 |
| JP | 08169539 | 7/1996 |

OTHER PUBLICATIONS

International Search Report dated Oct. 16, 2000, application No. PCT/JP 00/04273.

* cited by examiner

*Primary Examiner*—Douglas Hess
(74) *Attorney, Agent, or Firm*—RatnerPrestia

(57) ABSTRACT

An apparatus whereby cylindrical cans formed of a ferromagnetic material and transported at high speed along a carrying conveyor in such a contiguous way as having no gaps between adjoining cylindrical cans are separated so as to provide a spacing therebetween to eliminate interference between the adjoining cylindrical cans, thereby supplying a plurality of cylindrical cans with reliability to a main index wheel of an automatic machine for producing cylindrical cans. The apparatus includes a carrying conveyor, star index wheel, supply index wheel and main index wheel. The supply index wheel has permanent magnets, each holding an individual cylindrical can by suction. The transport speed of a plurality of cylindrical cans transported along a conveyor at high speed is reduced for a moment by the star index wheel. Then, each respective cylindrical can is held by suction caused by magnetic force from permanent magnets disposed around the outer edge of the disc-shaped supply index wheel and spaced uniformly to provide a spacing between adjoining cylindrical cans. While maintaining the foregoing spacing, the cylindrical cans are supplied to the main index wheel of the automatic machine for producing cylindrical cans.

14 Claims, 4 Drawing Sheets

APPARATUS FOR SEPARATING AND SUPPLYING CYLINDRICAL CANS AND METHOD THEREFORE

This application is a U.S. National Phase Application of PCT International Application PCT/JP00/04273, filed on Jun. 29, 2000.

TECHNICAL FIELD

The present invention relates to an apparatus and method for separating and supplying a plurality of cylindrical cans, and more specifically relates to an apparatus for separating individually a plurality of cylindrical cans that are received in a contiguous fashion and sending out with stability such cans as received and also relates to a method for separating and supplying such a plurality of cylindrical cans.

BACKGROUND ART

Apparatuses for separating and supplying cylindrical battery cans that are received in succession have been long known. An example from such conventional apparatuses is disclosed in U.S. Pat. No. 5,695,041. The exemplified conventional apparatus for separating and supplying cylindrical battery cans is described below with reference to FIG. 4. Suppose a situation, in which cylindrical battery cans move along a high-speed running belt conveyor in a contiguous fashion without any gaps between the cylindrical battery cans. In FIG. 4, a carrying conveyor 32 runs in the direction indicated by an arrow. Cylindrical battery cans 31 are transported on the carrying conveyor 32. The cylindrical battery cans 31 are formed of a ferromagnetic material. A star index wheel 33, a supply index wheel 34a of an automatic machine and a main index wheel 34b of the automatic machine are disposed at a side of the carrying conveyor 32. A plurality of first semi-circular notches 38 are formed around the outer edge of the star index wheel 33 and spaced uniformly, with the radius of each respective semi-circular notch 8 made nearly equal to the radius of the battery can 31. The first semi-circular notches 38 in plurality receive the transported battery cans 31. A plurality of second semi-circular notches 41 are formed around the outer edge of the supply index wheel 34a of the automatic machine and spaced uniformly. A plurality of third semi-circular notches 39 are formed around the outer edge of the main index wheel 34b of the automatic machine and spaced uniformly. Each semi-circular notch of the first semi-circular notches 38, second semi-circular notches 41 and third semi-circular notches 39 receives the transported battery cans 31, respectively. The star index wheel 33 rotates around its center that acts as the rotational center and the center of each respective first semi-circular notch 38 traces a first circular locus. The supply index wheel 34a of the automatic machine rotates around its center that acts as the rotational center and the center of each respective second semi-circular notch 41 traces a second circular locus. The main index wheel 34b of the automatic machine rotates around its center that acts as the rotational center and the center of each respective third semi-circular notch 39 traces a third circular locus. The first locus and second locus are overlapped at the center line of the carrying conveyor 32. The second locus and third locus circumscribe each other. The carrying conveyor 32 is located between the supply index wheel 34a and the main index wheel 34b. The carrying conveyor 32, star index wheel 33, supply index wheel 34a and main index wheel 34b rotate in the directions indicated by arrows at a synchronizing speed, respectively, thereby allowing the battery cans to be transported without a hitch.

The battery can carrying conveyor 32 has a flat belt and a conveyor frame. A permanent magnet 43 is fixed on the conveyor frame, directly below the flat belt at a position between the star index wheel 33 and the supply index wheel 34a, where passing of the battery cans takes place. In order to prevent the battery cans from being ejected out of the first semi-circular circular notches 38, second semi-circular notches 41 and third semi-circular notches 39 due to centrifugal force produced by a high-speed revolution of the index wheels, a first guide 35, second guide 42 and third guide 52 are put in place. More specifically, the third guide 52 is disposed near the rim of the supply index wheel 34a.

The peripheral shifting speed of the center of the first semi-circular notch 38 is set to a speed slower than the running speed of the belt of the carrying conveyor 3. The shifting speed of the battery cans 31 located on the carrying conveyor in a contiguous way is suppressed momentarily by protrusions 40 formed between semi-circular notches in the star index wheel 33. Then, gaps are created between the outer side surfaces of the adjoining battery cans transported along the carrying conveyor 32 upon having the battery cans 31 released from the protrusions 40. During the period immediately after a battery can 31 is released from a protrusions 40 until the battery can 31 is carried to the second semi-circular notch 41 for being grabbed, the battery can 31 is being sucked by the strong force of magnetic attraction of the permanent magnet 43. The bottom of each respective battery can 31 is pressed onto the belt surface of the carrying conveyor 32 by a combined force produced by the own weight of the battery can 31 and the force of magnetic attraction of the permanent magnet 43. This pressing force multiplies the friction between the belt of the carrying conveyor 32 and the battery case 31, thereby reducing the slippage between the battery can 31 and the belt surface. As a result, shifting of the battery can 31 in position is made smaller. Thus, supplying of the battery cans 31 to the second semi-circular notches 41 of the supply index wheel 34a is carried out.

With the conventional structure as described above, although the traveling path of the battery cans 31 after released from the protrusions 40 in the star index wheel 33 till reaching the second semi-circular notches 41 is small in distance, it is in this traveling path that such a trouble as biting of battery cans and the like is most likely to occur. This kind of trouble results in lowering the availability factor of production lines of batteries and makes one of the serious causes to produce defective part pieces.

Further, an index wheel for separating battery cans by orientation is disclosed in the Published Unexamined Japanese Patent Application No. H3-156850. According to this prior art embodiment, a conventional star index wheel and a circular disc with a built-in permanent magnet are combined by being stacked together along the same axis. However, this prior art technology does not teach an apparatus for separating battery cans and supplying the separated battery cans to the next manufacturing step by having gaps provided between the side surfaces of adjoining cylindrical battery cans.

The present invention provides an apparatus for separating and supplying cylindrical cans, which allows a plurality of cylindrical cans transported along a carrying conveyor in a contiguous way without any gaps between adjoining cylindrical cans to be supplied with stability one by one from the carrying conveyor to a supply index wheel.

SUMMARY OF THE INVENTION

An apparatus for separating and supplying cylindrical cans of the present invention comprises:

(a) a carrying conveyor transporting a plurality of cylindrical cans,
   wherein the cylindrical cans in plurality are transported in a contiguous way without any gaps between adjoining side surfaces of respective cylindrical cans, and
   wherein each respective cylindrical can of above is cylindrical-shaped and formed of a ferromagnetic material;

(b) a star index wheel having a plurality of first semi-circular notches,
   wherein the star index wheel is located at a side of the carrying conveyor and rotatable,
   wherein the first semi-circular notches in plurality are formed around the outer edge of the star index wheel and spaced uniformly, and
   wherein each respective first semi-circular notch of above receives the cylindrical cans individually;

(c) a supply index wheel having a plurality of cylindrical can holders,
   wherein the supply index wheel is disc-shaped and rotatable, and wherein each respective cylindrical can holder of above is provided with a permanent magnet individually and the respective permanent magnets are disposed around the outer edge of the supply index wheel so as to have the axis direction of the cylindrical can aligned in parallel to the axis direction of the supply index wheel and to have a first spacing created as a gap between side surfaces of adjoining cylindrical cans of above, thereby allowing the respective cylindrical cans to be held by suction caused by magnetic force from each respective permanent magnet of above; and (d) a main index wheel having a plurality of transport holders,
   wherein the main index wheel is provided with a peripheral edge surface and rotatable, and
   wherein the respective transport holders of the transport holders in plurality are disposed on the peripheral edge surface of the main index wheel and spaced uniformly, thereby allowing each respective transport holder to hold cylindrical cans individually.

The star index wheel, supply index wheel and main index wheel are synchronized with one another in rotational speed, the carrying conveyor, star index wheel and supply index wheel are located so as to have the center locus of the first semi-circular notches of the star index wheel and the center locus of the cylindrical cans held by suction on the respective holders of the supply index wheel circumscribed with each other and overlapped on the center line of the cylindrical cans located on the carrying conveyor, and the cylindrical cans held by suction caused by magnetic force to a predetermined position on the supply index wheel are sent out to the main index wheel one by one.

A method for separating and supplying a plurality of cylindrical cans of the present invention comprises the steps of:

(a) transporting a plurality of cylindrical cans along a carrying conveyor,
   wherein the cylindrical cans in plurality are transported in a contiguous way without any gaps between adjoining side surfaces of respective cylindrical cans, and
   wherein each respective cylindrical can of above is cylindrical-shaped and formed of a ferromagnetic material;

(b) holding the respective cylindrical cans transported along the carrying conveyor around the outer edge of a rotating receiving index wheel with a predetermined spacing provided between adjoining cylindrical cans after having received the cylindrical cans;

(c) holding the respective cylindrical cans held by the receiving index wheel onto a plurality of holders formed on a supply index wheel,
   wherein the supply index wheel is disc-shaped and rotatable,
   wherein each respective holder of a plurality of the holders is provided with a permanent magnet, and the respective permanent magnets are disposed around the outer edge of the supply index wheel so as to have the axis direction of the cylindrical can aligned in parallel to the axis direction of the supply index wheel and to have a first spacing created as a gap between side surfaces of adjoining cylindrical cans of above, thereby allowing respective cylindrical cans to be held by suction caused by magnetic force from each respective permanent magnet of above; and (d) holding the respective cylindrical cans held by the supply index wheel onto each respective transport holder of the transport holders in plurality disposed on a main index wheel,
   wherein the main index wheel is provided with a peripheral edge surface and rotatable, and
   wherein the respective transport holders of a plurality of the transport holders are disposed on the peripheral edge surface of the main index wheel and spaced uniformly, thereby allowing the cylindrical cans held by suction caused by magnetic force at predetermined positions of the supply index wheel to be sent out to the main index wheel one by one.

According to the structure as described in the above, cylindrical cans transported at high speed along a carrying conveyor in a contiguous way without any gaps between adjoining cylindrical cans are provided with a spacing between the side surfaces of adjoining cylindrical cans, thereby preventing the cylindrical cans from becoming unstable due to the interference occurring between adjoining cylindrical cans and feeding the cylindrical cans with reliability to an automatic production machine of cylindrical cans, which is responsible for the production steps that follow. In addition, such a trouble as biting of cylindrical cans that occurs in a supply index wheel is prevented. As a result, the availability factor of the production facilities is enhanced and also product defects are decreased. Furthermore, a simple and less costly apparatus for separating and supplying cylindrical cans having high reliability and a high availability is provided. Moreover, the level of noise made by the apparatus for separating and supplying cylindrical cans is remarkably lowered.

BEST MODE FOR CARRYING OUT THE INVENTION

Figure 1:
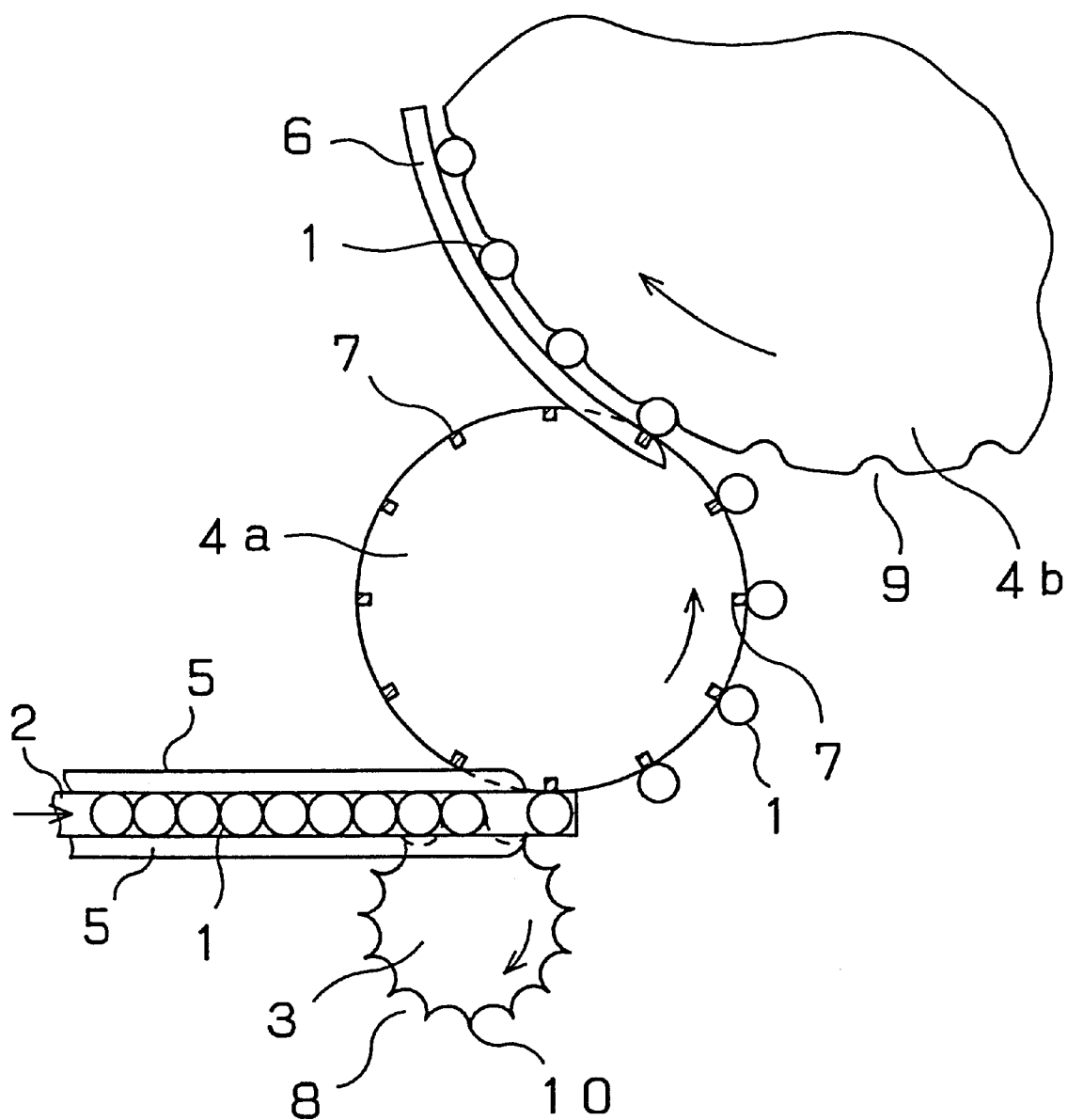
FIG. 1 is a plan view to illustrate an apparatus for separating and supplying battery cans in an exemplary embodiment of the present invention.

According to an apparatus and method for separating and supplying a plurality of cylindrical cans in an exemplary embodiment of the present invention, cylindrical cans formed of a ferromagnetic material and transported at high speed along a carrying conveyor in a contiguous way without any gaps between adjoining cylindrical cans are separated from one another with a spacing provided between side surfaces of adjoining cylindrical cans, thereby preventing the interference occurring between adjoining cylindrical cans and feeding the cylindrical cans with reliability to the main index wheel of an automatic production machine of cylindrical cans. The apparatus for separating and supplying a plurality of cylindrical cans comprises a carrying conveyor, receiving index wheel, supply index wheel and main index wheel.

The supply index wheel is provided with permanent magnets for holding respective cylindrical cans by suction. The transporting speed of the cylindrical cans transported in plurality along the conveyor at high speed is once reduced by means of the receiving index wheel. Then, the respective cylindrical cans are held by suction onto the permanent magnets disposed and spaced uniformly around the outer edge of the disc-shaped supply index wheel, and a spacing is formed between adjoining cylindrical cans, thereby allowing the cylindrical cans to be fed to the main index wheel of an automatic machine of can production facilities while the spacing between adjoining cylindrical cans being maintained.

In other words, the apparatus for separating and supplying cylindrical cans according to the present invention is provided with a structure to expand the spacing between adjoining cylindrical cans transported in a contiguous way without any gaps between adjoining cylindrical cans on the carrying conveyor running at high speed along a guide while the side surfaces of respective adjoining cylindrical cans being brought into contact with each other. The respective cylindrical cans are formed of a ferromagnetic material. The apparatus for separating and supplying cylindrical cans according to the present invention is provided with a receiving index wheel disposed at a side of the carrying conveyor. The receiving index wheel is a star index wheel which has a plurality of first semi-circular notches to receive cylindrical cans, each respective first semi-circular notch having a dimension generally equal to the diameter of the battery can, disposed and uniformly spaced around the outer edge of the star index wheel. The centers of the respective semi-circular notches formed on the star index wheel rotate at a peripheral shifting speed that is somewhat slower than the running speed of the carrying conveyor.

A protrusions is formed between adjoining first semi-circular notches.

The shifting distance of a running carrying conveyor's belt is set so as to be larger than the cylindrical can's diameter. Cylindrical can holders are disposed around the outer edge of the supply index wheel and have a permanent magnet, respectively. Accordingly, the spacing between the cylindrical cans is allowed to be expanded.

The shifting speed of the cylindrical cans placed on the carrying conveyor in a contiguous way is suppressed momentarily by the protrusions formed on the star index wheel, and thereafter the shifting speed is released from the speed suppression, thereby allowing the cylindrical cans to pick up speed gradually and to start running again at the same speed as the carrying conveyor. However, during the time period, in which adjoining cylindrical cans are released from the star index wheel in succession, a spacing is created between adjoining cylindrical cans since the shifting distance of the running carrying conveyor's belt is so set as to be larger than the cylindrical can's diameter. The spacing thus created between adjoining cylindrical cans is adjusted to become equal to the spacing between the cylindrical can holders disposed around the outer edge of the disc-shaped supply index wheel in the succeeding step that follows. With this spacing maintained for the cylindrical cans that are held by suction onto the cylindrical can holders disposed around the outer edge of the supply index wheel, the cylindrical cans are supplied to the main index wheel of an automatic machine from the supply index wheel.

The star index wheel rotates in synchronization with the rotation of the supply index wheel and main index wheel, thereby preventing the side surfaces of adjoining cylindrical cans from being brought into contact with each other. Therefore, an adverse effect caused by mutual interference between cylindrical cans can be prevented from occurring. Further, an irregular supply of cylindrical cans can also be prevented, resulting in a smooth supply of cylindrical cans with stability.

The cylindrical cans formed of a ferromagnetic material and aligned on the carrying conveyor with the side surfaces of adjoining cylindrical cans being brought into contact with each other are supplied in a contiguous way without any gaps between the adjoining cylindrical cans. The spacing between the adjoining cylindrical cans supplied in such a fashion as above is expandable, thereby eliminating the danger of interference arising between adjoining cylindrical cans and allowing the cylindrical cans to be supplied one by one to the main index wheel of the automatic machine with stability.

The supply index wheel is provided with permanent magnets disposed and spaced uniformly around the vicinity of the outer edge of the disc of the supply index wheel. Each respective permanent magnet can suck a cylindrical can located within 2 to 3 mm in distance therefrom. Therefore, even when a cylindrical can is supplied with its position displaced a little from the place where the cylindrical can should be located, the displaced cylindrical can is sucked by the permanent magnet and is allowed to be held by suction with its position corrected onto the predetermined position of the supply index wheel. Thus, the supply index wheel is provided with a positional self-correcting mechanism. Therefore, a substantial expansion becomes possible for the tolerance of variation in timing of the transportation of battery cans, the variation being caused by the slippage between the belt conveyor's surface and the cylindrical cans during the time period after the cylindrical cans have been released from the protrusions to prevent the cylindrical cans disposed on the carrying conveyor in a contiguous fashion from shifting in position till the cylindrical cans are transported to the supply index wheel. In addition, since the supply index wheel has no longer an outer guide as used to be with the prior art, such a problem as biting of the cylindrical cans in the supply index wheel is eliminated, thereby enabling the reliability of the apparatus to be enhanced greatly.

Exemplary Embodiment 1

A description is given to an apparatus for separating and supplying cylindrical cans in an exemplary embodiment of the present invention with reference to drawings. FIG. 1 is a plan view of the apparatus for separating and supplying cylindrical cans as disclosed by the present invention.

An apparatus for separating and supplying cylindrical cans in an exemplary embodiment of the present invention comprises a carrying conveyor 2, star index wheel 3, supply index wheel 4a of an automatic machine and main index wheel 4b of the automatic machine. As a cylindrical can 1 is used a cylindrical-shaped battery can 1. The battery can 1 is formed of a ferromagnetic material and can be attracted by suction to a magnet. The carrying conveyor 2 transports the battery cans in the direction indicated by an arrow in a contiguous way without any gaps between adjoining battery cans. The star index wheel 3 controls the speed of the battery cans 1 that are transported at high speed along the carrying conveyor 2, thereby performing a function to expand the spacing between adjoining battery cans 1. The star index wheel 3 has first semi-circular notches formed around the outer edge thereof The star index wheel 3 is rotatable and the peripheral speed of the center of each respective first semi-circular notch 8 of the star index wheel 3 is set to a speed a little slower than the transport speed of the carrying conveyor 2. Each of the first semi-circular notches 8 performs a function of receiving and transporting the cylindrical cans 1 one after another. The star index wheel 3 has a protrusion 10 formed between the first semi-circular notches 8 adjoining each other. A supply index wheel 4a is provided with a peripheral edge surface and rotatable, and cylindrical can holders 7 are formed and spaced uniformly on the peripheral edge surface of the supply index wheel 4a. Each respective cylindrical can holder 7 has a permanent magnet 7 buried therein. The permanent magnet 7 is strong enough magnetically to allow a battery can 1 to be attracted by suction. A main index wheel 4b is provided with a peripheral edge surface and rotatable, and cylindrical can transport holders 9 are formed and spaced uniformly on the peripheral edge surface of the main index wheel 4b. Each respective transport holder 9 has a second semi-circular notch 9. A first guide 5 is disposed in the vicinity of the carrying conveyor 2. A second guide 6 is disposed near the rim of the main index wheel 4b.

The carrying conveyor 2 and star index wheel 3 are located in such a way that the locus of the center of a battery can 1 transported along the carrying conveyor 2 is brought into contact with the locus of the center of a battery can 1 held and transported by the star index wheel 3 and supply index wheel 4a. Further, the supply index wheel 4a and main index wheel 4b are located in such a way that the locus of a battery can 1 transported by the supply index wheel 4a and the locus of a battery can 1 transported by the main index wheel 4b circumscribe each other. In addition, the star index wheel 3, supply index wheel 4a and main index wheel 4b rotate in synchronization with one another, thereby allowing the battery cans 1 to be transported without a hitch. Also, after a battery can 1 has been transferred from a transport holder 9 of the supply index wheel 4a to a semi-circular notch 9 of the main index wheel 4b, the magnetic attracting force extended from the permanent magnet 7 to battery cans disappears due to the existence of the second guide 6 and the rotation of the supply index wheel 4b. As a result, the respective battery cans 1 transported along the carrying conveyor 2 at high speed are protected from an application of impact, thereby allowing a plurality of battery cans being supplied in a contiguous way to be separated individually from one another and supplied to the main index wheel of the automatic machine smoothly and reliably.

Exemplary Embodiment 2

Figure 2A:
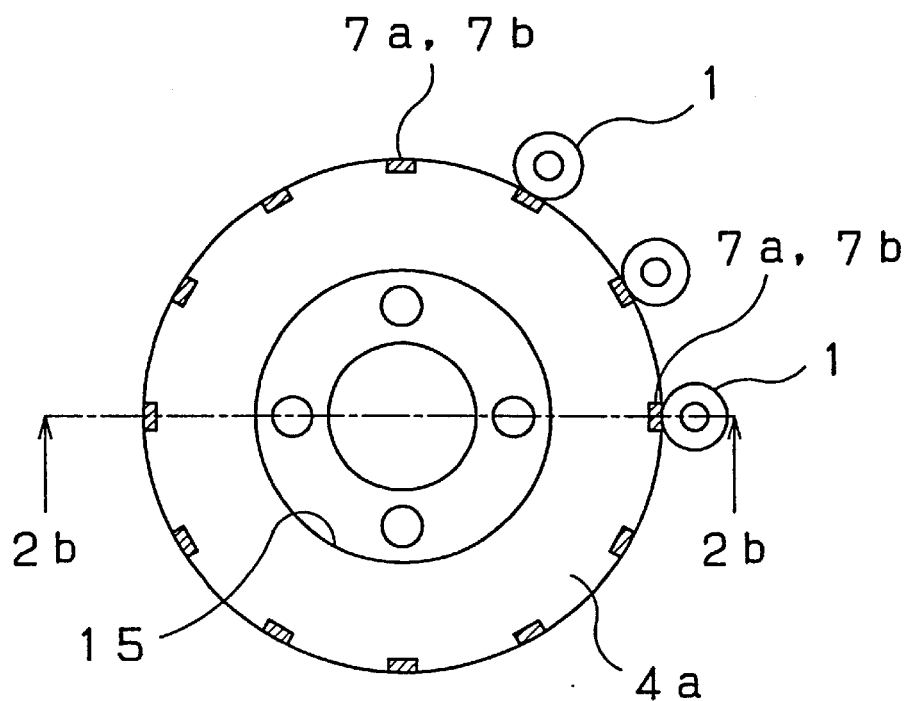
FIG. 2(*a*) is a plan view to illustrate a typical supply index wheel for an apparatus for separating and supplying battery cans in an exemplary embodiment of the present invention and FIG. 2(*b*) is a cross-sectional view of the supply index wheel of FIG. 2(*a*) cut along a dash and dotted line 2*b*—2*b*.
Figure 2B:
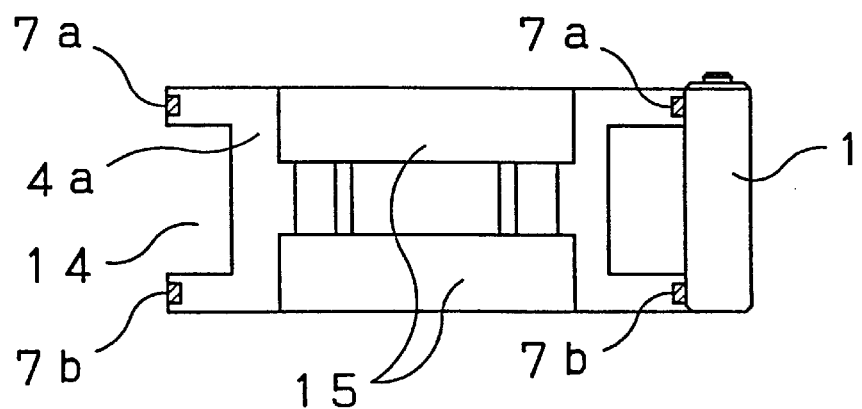

Next, a description is given to an apparatus for separating and supplying cylindrical cans in another exemplary embodiment of the present invention with reference to FIG. 2(a) and FIG. 2(b). With the present exemplary embodiment, an alkaline-manganese AA battery is used as the cylindrical can. A typical structure of the supply index wheel of an automatic machine used in the apparatus for separating and supplying cylindrical cans is illustrated in FIG. 2(a) and FIG. 2(b). FIG. 2(a) is a plan view of the supply index wheel and FIG. 2(b) is a cross-sectional view of the same cut along the line 2b—2b. In FIG. 2(a) and FIG. 2(b), how the battery can 1 is held on the supply index wheel 4a of the automatic machine is illustrated. Each respective battery can 1 out of a plurality of the AA battery cans is held onto a cylindrical can holder 7 by suction. The supply index wheel 4a is formed of a non-magnetic SUS 304 material and shaped like a disc measuring 106 mm in outer diameter and 48 mm in thickness. The cylindrical can holders 7 are formed on the rim of the disc-shaped supply index wheel 4a. More specifically, each respective cylindrical can holder 7 is located at a position formed by dividing the rim of the disc into twelve equal sections and holds a battery can 1. Each respective cylindrical can holder 7 has two permanent magnets of a first permanent magnet 7a and second permanent magnet 7b buried therein. Each of the two permanent magnets 7a and 7b is formed of a cobalt-containing magnet measuring 3 mm in diameter and 5 mm in length, respectively, and the pair of the permanent magnets 7a and 7b are aligned in parallel with each other in the axis direction of the supply index wheel 4a with a 40 mm spacing provided therebetween. These permanent magnets 7a and 7b are fixed onto the supply index wheel 4a according to a swaging method with the surface of the respective permanent magnets 7a and 7b situated a little below the surface of the peripheral edge.

Since the two permanent magnets 7a and 7b are arranged in position with 40 mm apart from each other in the axis direction of the disc-shaped supply index wheel 4a, each respective battery can 1 is held onto the cylindrical can holder 7 with stability so as to have the axis of each respective battery can 1 held onto the cylindrical can holder 7 by suction made parallel to the axis of the supply index wheel 4a. With the diameter of the permanent magnet decreasing, the accuracy in positioning the battery can is enhanced. When the diameter of the permanent magnet 7 is 3 mm, a variation in the position of the battery cans ranges between about ±1 mm, thereby allowing the battery cans 1 to be supplied with stability. The permanent magnet 7 is also formed of a ferrite magnet, a rare-earth magnet or the like. The magnetic force of a rare-earth magnet is stronger than that of a ferrite magnet. According to the required accuracy in positioning, required strength in magnetic force and the like, the kind, shape and size and the like of the permanent magnet 7 are determined on an as needed basis. In general, a rare-earth magnet is more expensive than a ferrite magnet. The supply index wheel 4a has a first recessed area 14 formed on the peripheral edge surface thereof and a second recessed area 15 formed on the upper and lower surfaces thereof, respectively. Due to the provision of the first recessed area 14 and second recessed areas 15, a reduction in the thickness of the supply index wheel 4a is realized with an accompanying reduction in weight. These recessed areas 14 and 15 are formed according to a cutting method. It is not necessarily required of the supply index wheel 4a to have these recessed areas 14 and 15. When the supply index wheel 4a is formed of a relatively light material such as aluminum and the like, for example, the recessed areas 14 and 15 are not necessary.

Exemplary Embodiment 3

Figure 3A:
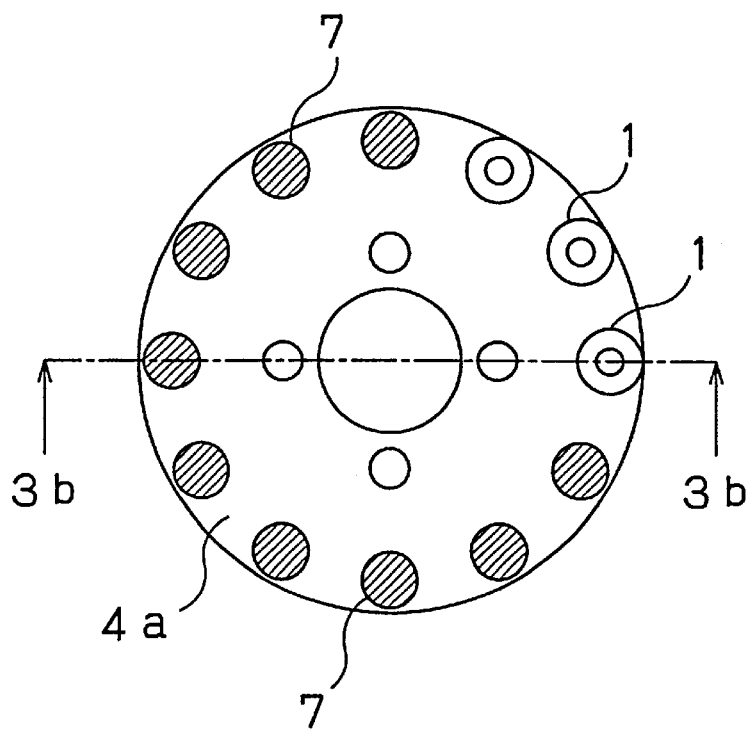
FIG. 3(*a*) is a plan view to illustrate the structure of a supply index wheel with permanent magnets buried uniformly along the peripheral edge of the upper surface of the supply index wheel used in an apparatus for separating and supplying battery cans in an exemplary embodiment of the present invention.
FIG. 3(b) is a cross-sectional view of the supply index wheel of FIG. 3(a) cut along a dash and dotted line 3b—3b.
Figure 3B:
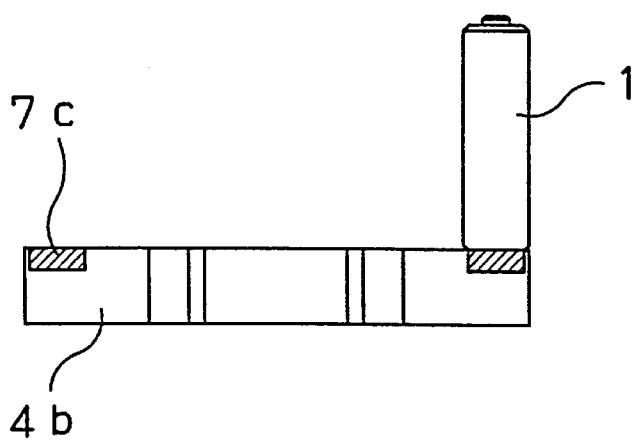
Figure 4:
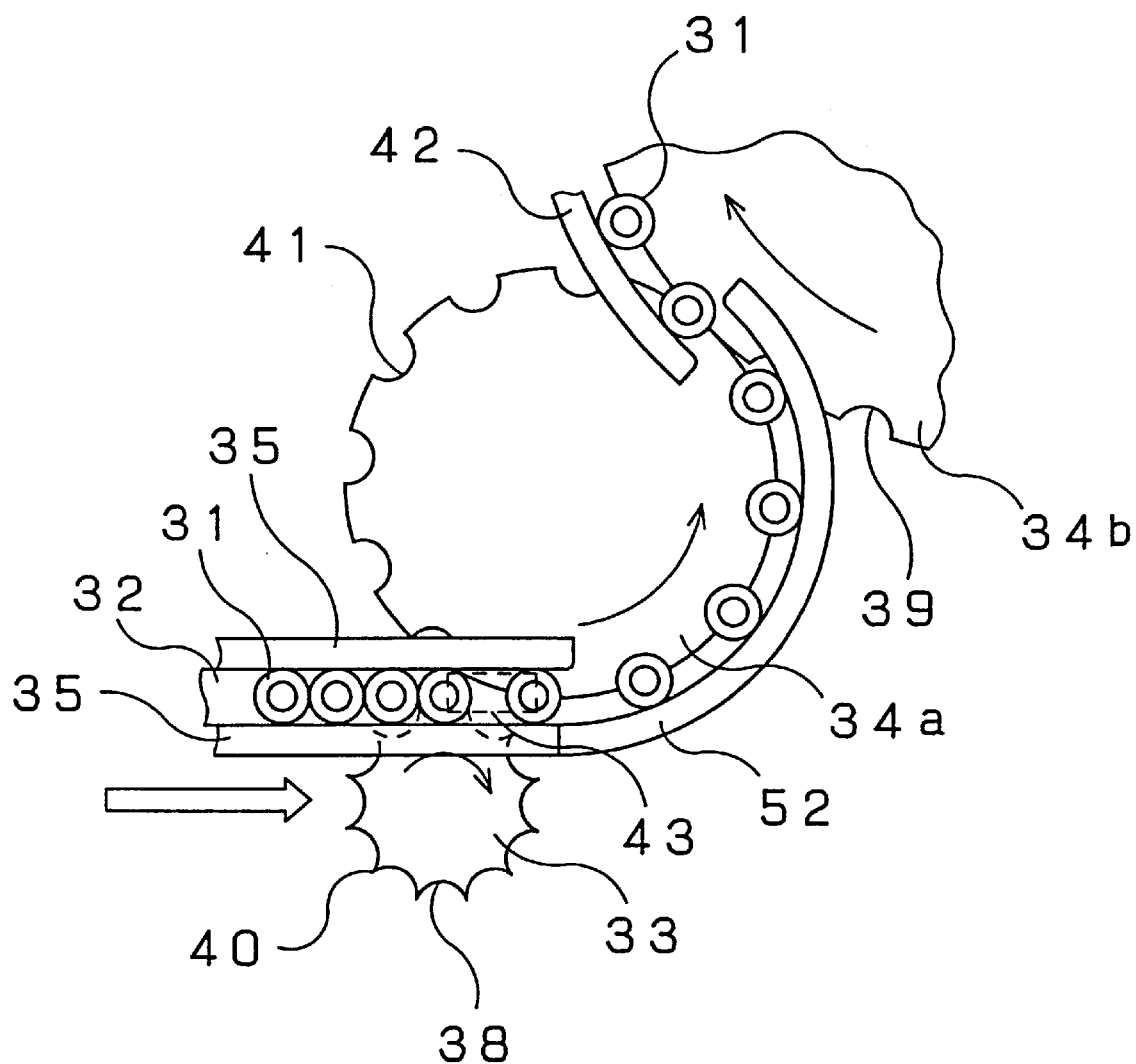
FIG. 4 is a plan view of a conventional apparatus for separating and supplying battery cans.

Next, a description is given to an apparatus for separating and supplying cylindrical cans in still another exemplary embodiment of the present invention with reference to FIG. 3(a) and FIG. 3(b). A typical structure of a supply index wheel of an automatic machine used in an apparatus for separating and supplying cylindrical cans is illustrated in FIG. 3(a) and FIG. 3(b). FIG. 3(a) is a plan view of the supply index wheel and FIG. 3(b) is a cross-sectional view of the supply index wheel cut along the line 3b—3b. As the cylindrical can 1 is used an AA battery can 1. In FIG. 3(a) and FIG. 3(b), the battery can 1 is held onto the supply index wheel 4a of the automatic machine. A plurality of the AA batteries are held by cylindrical can holders 7 by suction. The supply index wheel 4a is formed of a non-magnetic SUS304 material and shaped like a disc measuring 106 mm in outer diameter and 10 mm in thickness. On the surface of the disc-shaped supply index wheel 4a are formed the cylindrical can holders 7. More specifically, the cylindrical can holders 7 are located near the edge of the disc surface at the uniformly spaced positions on a concentric circle with the center thereof coinciding with the axis of the disc, the uniformly spaced positions being derived by dividing the concentric circle into twelve equal sections. Each respective cylindrical can holder 7 has a permanent magnet 7c, which is 12 mm in diameter and 3 mm in length, formed of a cobalt-containing permanent magnet and disposed on the disc with the axis thereof aligned in parallel to the axis direction of the supply index wheel 4a. Each respective permanent magnet 7c is fixed onto the supply index wheel 4a according to a swaging method with the surface thereof situated a little below the surface of the peripheral edge.

Exemplary Embodiment 4

An apparatus for separating and supplying cylindrical cans in still another exemplary embodiment of the present invention employs a disc having a plurality of fourth permanent magnets in place of the star index wheel of the exemplary embodiments 1, 2 and 3 as described in the above. The foregoing disc has a rim of a flat cylindrical-shape and a plurality of the fourth permanent magnets are buried in the rim with a predetermined spacing provided between the adjoining fourth permanent magnets. Each of the fourth permanent magnets disposed on the rim of the disc holds a cylindrical battery can by picking up one by one from a series of the cylindrical battery cans that are transported for a supply to the disc. The structure and operation of the present exemplary embodiment are the same as the structure and operation of each of the foregoing exemplary embodiments except for the above specific point of having a disc provided with permanent magnets.

Exemplary Embodiment 5

The apparatuses for separating and supplying cylindrical cans in the exemplary embodiments 1, 2, 3 and 4 as described in the above have been introduced into a production line for AA dry batteries. A plurality of the dry batteries are transported and supplied at a rate of ranging from about 1,000 units per minute to about 1,500 units per minute along a carrying conveyor 2. Even with these cylindrical battery cans transported at high speed, each respective cylindrical can holder 7 has been holding a battery can 1 with reliability. The respective battery cans 1 are transported by a transport holder 9 for transporting with reliability. Thus, a plurality of battery cans are allowed to be separated and supplied accurately, thereby enhancing the availability of the production facilities and further reducing remarkably the number of defective products caused by malfunctioning of the apparatus for separating and supplying cylindrical cans.

As described in the above, the present invention allows a spacing to be provided between adjoining side surfaces of the respective cylindrical cans that are transported along a carrying conveyor at high speed in a contiguous way without any gaps between adjoining cylindrical cans, thereby eliminating the instability of transportation due to interference occurring between adjoining cylindrical cans and supplying cylindrical cans with reliability to an automatic machine for the production of cylindrical cans that deals with the production steps to follow thereafter. The automatic machine has an apparatus for separating and supplying cylindrical cans of the present invention, in which permanent magnets, each acting as a cylindrical can holder, are buried on the rim of a disc-shaped supply index wheel and spaced uniformly, thereby enabling the speed and timing of a star index wheel, carrying conveyor, supply index wheel and the like to be adjusted very easily. In addition, the provision of holders utilizing magnetic force is in place on the supply index wheel makes it possible for a small amount of variations in positioning and timing of the cylindrical cans transported along the carrying conveyor to be automatically corrected, thereby having each respective cylindrical can held to a predetermined position and having the interference among the cylindrical cans in plurality that are being supplied prevented from taking place. Even when some of the cylindrical cans happen to be shifted in position or in timing due to slippage caused on the belt of the carrying conveyor, the positions of the cylindrical cans in plurality are automatically corrected, thereby enabling the assured supply of the cylindrical cans to a main index wheel of the automatic machine with reliability. As a result, availability of the production facilities is enhanced. Moreover, the number of defective products is reduced.

Further, with the apparatus for separating and supplying cylindrical cans of the present invention, the supply index wheel 4a does not require an outer guide that was needed with a conventional apparatus for separating and supplying cylindrical cans. The structure requiring no outer guide prevents the biting of cylindrical cans on the supply index wheel 4a from occurring.

In addition, since cylindrical cans are transported while being held by suction of magnetic force onto the rim of the supply index wheel, a simple mechanism allows the cylindrical cans to be separated and transported with a high degree of accuracy. More specifically, a torque limiter for preventing slippage of cylindrical cans on the rim of the supply index wheel when an excessive load is imposed is no longer required. Thus, an apparatus for separating and supplying cylindrical cans with enhanced reliability and high availability of production facilities, yet with a simple and inexpensive mechanism, is realized. Furthermore, the level of noises produced at the time of operating the apparatus for separating and supplying cylindrical cans has been reduced to a great extent.

Industrial Applicability

An apparatus for separating and supplying cylindrical cans disclosed by the present invention allows cylindrical cans transported along a carrying conveyor at high speed in such a contiguous way as having no gaps between the cylindrical cans to be spaced between the outer surfaces of adjoining cylindrical cans, thereby eliminating the instability of transportation due to interference between adjoining cylindrical cans and supplying the cylindrical cans with reliability to an automatic machine for producing cylindrical cans that handles the production steps that follow thereafter. More specifically, biting of cylindrical cans on a supply index wheel can be prevented. As a result, availability of production facilities is enhanced and further the number of defective products is reduced. Thus, an apparatus for separating and supplying cylindrical cans with enhanced reliability and high availability of production facilities, yet with a simple and inexpensive mechanism, is realized. Furthermore, the level of noises produced at the time of operating the apparatus for separating and supplying cylindrical cans has been reduced to a great extent.

What is claimed is:

1. Apparatus for moving cylinders, said apparatus comprising:
   a carrying conveyor for supplying said cylinders,
   a supply index wheel having a plurality of magnets spaced around said wheel substantially at a surface of said wheel, said cylinders being adhered to said wheel by said magnets at locations of a substantially circular periphery of said wheel corresponding to said magnets, said supply index wheel being without cylinder receiving notches whereby said cylinders are displaceable along said periphery of said wheel; and
   a main index wheel having notches for receiving said cylinders from said supply index wheel.

2. The apparatus according to claim 1, wherein said permanent magnets are buried on said outer edge of said supply index wheel.

3. The apparatus according to claim 1,
   wherein said magnets include at least two permanent magnets which are situated at each of said locations,
   said at least two permanent magnets are disposed on said supply index wheel in parallel to an axis of said supply index wheel with a spacing provided between said two permanent magnets, said spacing being determined according to a length of said cylinder, and
   said at least two permanent magnets hold an upper area and lower area of the side surface of said each respective cylinder by suction caused by magnetic force,
   thereby maintaining stability of cylinders held and transported on a peripheral edge surface of said supply index wheel in an axial direction of said each respective cylinder.

4. The apparatus according to claim 3, herein said supply index wheel has second semi-circular notches formed on at least one surface of upper and lower surfaces of said supply index wheel.

5. The apparatus according to claim 1, wherein said magnets are disposed on an upper surface of said supply index wheel concentrically around an axis of said supply index wheel and spaced uniformly, and holds a bottom surface of said cylinders by suction caused by magnetic force.

6. The apparatus according to claim 5, wherein said magnets each have approximately the same diameter as said cylinders and holds a bottom surface of said cylinders by suction caused by magnetic force.

7. Apparatus according to claim 1, further comprising a star index wheel having notches for moving said cylinders between said carrying conveyor and said supply index wheel.

8. A method of moving cylinders, said method comprising the steps of:
   supplying said cylinders;
   holding by magnetic force said cylinders to a substantially circular surface of a supply index wheel being without cylinder receiving notches whereby said cylinders are displaceable along said surface of said supply index wheel,
   receiving said cylinders from said supply index wheel into notches of a main index wheel.

9. The method according to claim 8, wherein said supply index wheel and said main index wheel are synchronized with one another in rotational speed.

10. The method according to claim 8, wherein said magnetic force is provided by a plurality at permanent magnets buried on an outer edge of said supply index wheel.

11. The method according to claim 8,
   wherein said magnetic force is provided by at least two permanent magnets,
   said at least two permanent magnets are disposed on said supply index wheel in parallel to an axis of said supply index wheel with a spacing provided between said two permanent magnets, said spacing being determined according to a length of one of said cylinders, and
   said at least two permanent magnets hold an upper area and lower area of the side surface of said one of said cylinders by suction caused by magnetic force,
   thereby maintaining stability of said one of said cylinders held and transported on a peripheral edge surface of said supply index wheel in an axial direction of said one of said cylinders.

12. The method according to claim 8, wherein said magnetic force is provided by a plurality of magnets, each disposed on an upper surface of said supply index wheel concentrically around an axis of said supply index wheel and spaced uniformly, and holding a bottom surface of said cylinders by suction caused by magnetic force.

13. The method according to claim 8, wherein said magnet force is provided by magnets, each has approximately the same diameter as said cylinders and holds a bottom surface of said cylinders by suction caused by magnetic force.

14. A method of moving cylinders according to claim 8, further comprising the step of rotating a star index wheel having notches in order to receive said cylinders as they are supplied and to bring said cylinders towards said supply index wheel so that they are held by magnetic force to said surface of said supply index wheel.

* * * * *